: 2,735,829
Patented Feb. 21, 1956

2,735,829

COMPOSITIONS CONTAINING A MIXTURE OF GLYCIDYL POLYETHERS OF DIHYDRIC PHENOLS

Quentin T. Wiles, Ogallala, Nebr., and Daniel W. Elam, Berkeley, Calif., assignors to Shell Development Company, Emeryville, Calif., a corporation of Delaware No Drawing. Application July 5, 1952,
Serial No. 297,384

10 Claims. (Cl. 260—42)

This invention relates to new compositions of matter containing glycidyl polyethers of dihydric phenols, which compositions cure to hard tough resinous materials upon addition thereto of a curing agent and are very useful because of unique properties in applications for adhesive, potting, casting and surface coating purposes.

Useful resins have been prepared heretofore by curing a glycidyl polyether of a dihydric phenol with the aid of various curing agents such as amines, dicarboxylic acid anhydrides, and certain acids. The resins-forming ingredient employed for this purpose is the glycidyl polyether of a dihydric phenol which is a simple substance or linear condensation polymer. The glycidyl polyether is obtainable by reacting at about 50° C. to 150° C. one to two or more mols of epichlorohydrin with a mol of dihydric phenol in the presence of a base such as sodium or potassium hydroxide in amount of about 2 to 30% stoichiometric excess of base to the dihydric phenol. Glycidyl polyethers of low molecular weight are obtainable by mixing a large excess such as about 4 to 10 mols of epichlorohydrin with a mol of dihydric phenol and adding an alkali to the heated mixture while the reaction progresses, the addition of the alkali being regulated so that the reaction mixture is kept at or near the neutral point. The unreacted excess of epichlorohydrin is removed by distillation from the resulting reaction product. The polyethers are also obtainable by substituting glycerol alpha,alpha'-dichlorohydrin for the epichlorohydrin in the noted methods and using about twice the amount of base.

The predominant constituent of the glycidyl polyether of dihydric phenol is represented by the formula

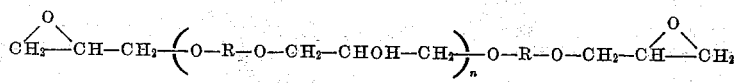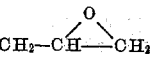

wherein R represents the divalent aromatic hydrocarbon radical (which was linked directly to the two hydroxyl groups of starting dihydric phenol), and $n$ is an integer of the series 0, 1, 2, 3, etc. The glycidyl polyether also contains a small proportion of compounds of similar structure wherein one or both of the glycidyl radicals are replaced by 2,3-dihydroxypropyl radicals (from hydration of glycidyl radicals) and/or 3-chloro-2-hydroxypropyl radicals (from incomplete dehydrochlorination). The glycidyl polyether is thus seen to have a chain of alternating glyceryl and divalent radicals united through ether oxygen with glyceryl radicals in terminal position. The ether oxygen (as distinguished from exopy oxygen and hydroxyl oxygen) is linked to the primary carbon atoms of the glyceryl radicals. The excess valencies of the glyceryl radicals over those which link epoxide and ether oxygen, link and chemically bind hydroxyl groups and chlorine atoms of the hydrated and hydrochlorinated glycidyl groups in the molecule.

The molecular weight of the glycidyl polyether which is reflected in the value of $n$ in the above formula is dependent upon the ratio of epichlorhydrin (or the substitute therefor) to dihydric phenol employed in preparing the polyether. The use of a ratio of about 1.25 mols of epichlorhydrin per mol of dihydric phenol gives glycidyl polyether of intermediate molecular weight and chain length. By increasing the ratio of epichlorhydrin to dihydric phenol, the molecular weight is decreased. If the mol ratio of epichlorhydrin to dihydric phenol is about 10:1, the product is essentially the diglycidyl diether of the dihydric phenol with $n$ equal to or closely approaching zero. Likewise, the use of decreasing ratios of epichlorhydrin to dihydric phenol gives products of higher molecular weight. Although glycidyl polyether of highest molecular weight is obtainable by use of low ratios of epichlorhydrin to dihydric phenol, it is preferred to effect preparation by a different method owing to the fact that removal of the formed salt and excess base from the higher products is so difficult. By reacting less than an equivalent amount of dihydric phenol with a previously prepared glycidyl polyether of dihydric phenol of intermediate molecular weight, there is obtained glycidyl polyether of high molecular weight. The reaction is effected by heating and mixing the dihydric phenol with the intermediate molecular weight glycidyl polyether in a melt and maintaining the temperature at about 200° C. for several hours time whereby the thermoplastic glycidyl polyether of high molecular weight is obtained.

In using the glycidyl polyether of a dihydric phenol in many applications such as for adhesive, potting, casting and like purposes, it is desirable and customary to employ a polyether having mobile fluidity at ordinary temperature so as to facilitate spreading or pouring thereof. By choosing a glycidyl polyether of proper type having a low molecular weight, the polyether has suitable mobile fluidity for such purposes. The glycidyl polyether is usually employed in such applications in undiluted condition because incorporation of most inert fluidizing solvents with the polyether gives a cured resin which has greately reduced physical strength as compared to the cured resin from undiluted polyether. While considerable success has been obtained in using a normally fluid glycidyl polyether of a dihydric phenol in adhesive and potting applications, the resulting cured resin has certain deficiencies in properties. The cured resin is unduly brittle and lacks desired toughness.

We have now found this lack of desired properties can be overcome by a mixture of two different glycidyl polyethers of a dihydric phenol wherein a small proportion of glycidyl polyether of high molecular weight is in admixture with glycidyl polyether of low molecular weight. Although, as explained above, the molecular weight and chain length (value of $n$) of a glycidyl polyether of a dihydric phenol is dependent upon the ratio of epichlorhydrin to dihydric phenol employed in preparation thereof, and although the product from a given preparation is not a single entity with respect to molecular weight and chain length, but is to minor extent a mixture of compounds having somewhat different molecular weights, it was unexpected and surprising to discover that cured resin from our mixture has such superior properties as compared to those of cured resin from glycidyl polyether of a single preparation. It is not fully understood why the new and unexpected results are obtained. However, it may now be realized that our novel composition contains molecules of short chain length in admixture with molecules of long chain length and that molecules of intermediate chain length are substantially absent. The mixture of our invention is thus quite different in composition from prior glycidyl polyether of a dihydric phenol which has material of predominantly one chain length and only a small amount of polyethers of shorter and longer chain length therein.

In brief, our invention is a composition comprising a first glycidyl polyether of a dihydric phenol in admixture with about an added 3% to 20% by weight of a second glycidyl polyether of a dihydric phenol, which polyethers have a chain of alternating glyceryl and divalent aromatic radicals united through ether oxygen with glyceryl radicals in terminal position. The first glycidyl polyether which constitutes the bulk of the composition, has a Durrans' Mercury Method melting point below 25° C., has a 1,2-epoxy equivalency between about 1.7 and 2.0, and contains 1 to 1.5 of the aromatic radicals in the average molecule thereof. The second glycidyl polyether has a Durrans' Mercury Method melting point above 75° C., has a 1,2-epoxy equivalency of about 1.2 to 1.8, and contains at least 4 of the aromatic radicals in the average molecule thereof. The composition is thus glycidyl polyether of a dihydric phenol of short chain length having low melting point so as to be fluid at normal temperature in admixture with a small proportion of glycidyl polyether of a dihydric phenol of long chain length having a high melting point so as to be a solid at normal temperature. The dihydric phenol from which the two glycidyl polyethers are derived can be the same or different.

In describing our composition, we have referred to several terms which are in need of explanation and definition. By the Durrans' Mercury Method melting point of the polyethers reference is made to the melting point as determined by the method of T. H. Durrans for thermoplastic materials described in J. Oil and Colour Chem. Assoc., 12, 173–5 (1929). The method gives quite accurate and reproducible results.

The number of aromatic radicals in the average molecule of the glycidyl polyether of a dihydric phenol is equal to $n+1$ wherein $n$ is as described above with respect to the structural formula of the glycidyl polyethers. The value of $n$ is related to the molecular weight of the glycidyl polyethers. The molecular weight is conveniently measured by the customary ebullioscopic method with use of ethylene dichloride as solvent for the glycidyl polyether. The value of $n$ is calculated from the formula $$n = \frac{M - A - 146}{A + 90}$$

wherein M is the measured molecular weight of the glycidyl polyether, and A is the molecular weight of the divalent aromatic radical contained in the polyether, i. e., the calculated molecular weight of the aromatic radical which was linked directly to the two hydroxyl groups of the dihydric phenol from which the glycidyl polyether was derived.

The 1,2-epoxy equivalency of the glycidyl polyether is the number of epoxy groups

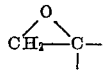

contained in the average molecule of the glycidyl polyether. The 1,2-epoxy equivalency is equal to the measured molecular weight divided by the epoxide equivalent weight. The epoxide equivalent weight is the weight of glycidyl polyether which contains and is equivalent to one 1,2-epoxy group. It is determined by heating a weighed sample of the polyether with an excess of 0.2 N pyridinium chloride in chloroform solution at the boiling point under reflux for two hours whereby the pyridinium chloride quantitatively hydrochlorinates the epoxy groups to chlorhydrin groups. After cooling, the excess pyridinium chloride is back-titrated with 0.1 N sodium hydroxide in methanol to the phenolphthalein end point. The epoxide equivalent weight is calculated by considering that each molecule of consumed HCl from the pyridinium chloride combines with an epoxy group.

The compositions of the invention are prepared by mixing the proper proportion of high melting glycidyl polyether with the low melting polyether. In order that the desired homogeneous mixture will be obtained, it is convenient to add the high melting polyether in finely divided or powdered condition to the low melting polyether which is heated to about 50° C. to 125° C. The mixture is then maintained hot, and is stirred until the mixture homogenizes with solution of the solid polyether in the melt. If desired, the high melting constituent may also be melted before addition to the low melting component.

The low melting component of the compositions is glycidyl polyether derived from any one of various dihydric phenols. Suitable dihydric phenols include and are exemplified by, but not limited to, such compounds as resorcinol, 1,1-bis(4-hydroxyphenyl)ethane, 1,1-bis(4-hydroxyphenyl)propane, 2,2-bis(4-hydroxyphenyl)propane, 1,1-bis(4-hydroxyphenyl)butane, 2,2-bis(4-hydroxyphenyl)butane, 1,1-bis(4-hydroxyphenyl)-2-methylpropane, 3,3-bis(4-hydroxyphenyl)pentane, and 1,1-bis(4-hydroxyphenyl)-2-ethylhexane. Also suitable are isomeric compounds to those listed above wherein the phenolic hydroxyl groups are in the 2,4' positions and the 2,2' positions. The dihydric phenols are seen to be free from functional groups other than the phenolic hydroxyl groups.

Although the compositions can contain glycidyl polyether of a dihydric phenol which has a Durrans' melting point below 25° C. as major component, by far the most striking obtainment of desirable properties are realized with compositions containing polyether having a melting point below about 15° C. Preferably the low melting constituent is glycidyl polyether of 2,2-bis(4-hydroxyphenyl)propane having a melting point below 15° C., particularly from about 5° C. to 12° C. Another very suitable low melting component is the glycidyl polyether of 1,1-bis(4-hydroxyphenyl)ethane.

As explained before, the dihydric phenol from which the low melting and high melting glycidyl polyether is derived can be either the same or different. It is generally preferred that both glycidyl polyethers be derived from a single dihydric phenol, and that it be 2,2-bis(4-hydroxyphenyl)propane. However, excellent results are obtained with compositions containing low melting glycidyl polyether of 1,1-bis(4-hydroxyphenyl)ethane and high melting glycidyl polyether of 2,2-bis(4-hydroxyphenyl)propane.

The high melting component of the compositions is glycidyl polyether of a dihydric phenol that has a Durrans' melting point above 75° C. and contains at least four $(n+1)$ of the aromatic radicals from the dihydric phenol. The aromatic radical is the whole divalent hydrocarbon radical of the dihydric phenol, i. e., the radical which was linked directly to the two phenolic hydroxyl groups of the dihydric phenol. For example, the aromatic radical contained in glycidyl polyether of resorcinol is the 3-phenylene radical, that in the polyether of 2,2-bis(4-hydroxyphenyl)propane is the 2,2-bis-(4-phenylene)propane radical, and that in the polyether of 1,1-bis(4-hydroxyphenyl)ethane is the 1,1-bis(4-phenylene)ethane radical.

While the long chain constituent of the composition has a Durrans' melting point above 75° C., best results are obtained with glycidyl polyether having a melting point considerably above this minimum. Excellent results are obtainable with polyether having a melting point of at least 125° C. There appears to be no particular upper limit to the melting point for suitability, but generally it is not greater than about 180° C. The glycidyl polyethers having a melting point between 125° C. and 180° C. which contain 6 to 15 of the aromatic radicals in the average molecule thereof are very suitable. Particularly preferred high melting glycidyl polyether for use in the compositions is glycidyl polyether of 2,2-bis(4-hydroxyphenyl)propane having a melting point of from 140° C. to 160° C. All of the high melting glycidyl polyethers have a 1,2-epoxy equivalency of about 1.2 to 1.8.

The high melting glycidyl polyethers can be derived from any of the particular dihydric phenols described above with respect to the low melting polyethers. If desired, the high melting polyethers can be prepared from other dihydric phenols such as, for example, 4,4'-dihydroxydiphenyl, bis(4-hydroxyphenyl)methane, 2,2-bis(4-hydroxy-2-methylphenyl)propane, 2,2-bis(4-hydroxy-2-tertiarybutylphenyl)propane, bis(2-hydroxynaphthyl)methane, 1,5-dihydroxynaphthalene, and the like. These dihydric phenols are also free from functional groups other than the two phenolic hydroxyl groups.

The compositions of the invention consist essentially of the low melting glycidyl polyether in admixture with about an added 3% to 20% by weight of the high melting glycidyl polyether, i. e., the compositions contain 100 parts by weight of low melting constituent and about 3 to 20 parts of high melting component. Very suitable compositions contain about an added 5% to 15% by weight of high melting glycidyl polyether. The compositions may also contain very minor amounts of impurities of various types normally associated with the glycidyl polyethers including free phenolic compounds such as phenol and/or the dihydric phenol from which the polyethers are derived. The compositions may be entirely free from phenols, but in any event, they contain less than about 0.004 equivalent of phenolic hydroxyl per 100 grams.

Preparation and properties of several typical glycidyl polyethers of dihydric phenols used in compositions of the invention are described below. For convenience, the described low melting polyethers will be designated L-1, L-2, etc., and the high melting polyethers will be identified as H-1, H-2, etc. The parts and percentages are by weight.

Polyether L-1

A solution is prepared by dissolving 2,2-bis(4-hydroxyphenyl)-propane in slightly aqueous epichlorhydrin in the proportion of 5,130 parts (22.5 mols) of the dihydric phenol in 20,812 parts (225 mols) of epichlorhydrin and 104 parts of water. The solution is prepared is a kettle provided with heating and cooling equipment, agitator, distillation condenser and receiver. A total of 1880 parts of solid 97.5% sodium hydroxide, corresponding to 2.04 mols of sodium hydroxide per mol of bis-phenol (2% excess) is added in installments. The first installment of 300 parts of sodium hydroxide is added and the mixture heated with efficient agitation. The heating is discontinued as the temperature reaches 80° C. and cooling is started in order to remove exothermic heat of reaction. The control is such that the temperature rises only to about 100° C. When the exothermic reaction has ceased and the temperature has fallen to 97° C., a further addition of 316 parts of sodium hydroxide is made and similar further additions are effected at successive intervals. An exothermic reaction takes place after each addition. Sufficient cooling is applied so there is gentle distillation of epichlorhydrin and water, but the temperature is not allowed to go below about 95° C. No cooling is necessary after the final addition of sodium hydroxide. After the last addition of sodium hydroxide with completion of the reaction, the excess epichlorhydrin is removed by vacuum distillation with use of a kettle temperature up to 150° C. and a pressure of 50 mm. Hg. After completion of the distillation, the residue is cooled to about 90° C. and about 360 parts of benzene are added. Cooling drops the temperature of the mixture to about 40° C. with precipitation of salt from the solution. The salt is removed by filtration and the removed salt carefully washed with about an additional 360 parts of benzene to remove polyether therefrom. The two benzene solutions are combined and distilled to separate the benzene. When the kettle temperature reaches 125° C., vacuum is applied and distillation continued to a kettle temperature of 170° C. at 25 mm. pressure. The resulting liquid glycidyl polyether of 2,2-bis(4-hydroxyphenyl)propane has the following properties.

| | |
|---|---|
| Durrans' melting point ° C | 9 |
| Molecular weight | 370 |
| Epoxide value (epoxide equivalents per 100 grams) | 0.50 |
| Epoxide equivalent weight | 200 |
| Hydroxyl value (hydroxyl equivalents per 100 grams) | 0.08 |
| Per cent chlorine | 0.46 |

From the above values, $n$ is 0.106 so the average molecule of the polyether contains 1.106 of the aromatic radicals therein. The 1,2-epoxy equivalency of the product is 1.85.

Polyether L-2

A solution consisting of 11.7 parts of water, 1.22 parts of sodium hydroxide, and 13.38 parts of 2,2-bis(4-hydroxyphenyl)propane is prepared by heating the mixture of ingredients to 70° C. and then cooling to 46° C. at which temperature 14.06 parts of epichlorhydrin are added while agitating the mixture. After 25 minutes have elapsed, there is added during an additional 15 minutes' time a solution consisting of 5.62 parts of sodium hydroxide in 11.7 parts of water. This causes the temperature to rise to 63° C. Washing with water at 20° C. to 30° C. temperature is started 30 minutes later and continued for 4½ hours. The product is dried by heating to a final temperature of 140° C. in 80 minutes, and cooled rapidly. At room temperature, the product is an extremely viscous, semi-solid having the following properties.

| | |
|---|---|
| Durrans' melting point ° C | 23 |
| Molecular weight | 460 |
| Epoxide value (equivalents epoxide per 100 grams) | 0.409 |
| Epoxide equivalent weight | 244 |
| Hydroxyl value (equivalents hydroxyl per 100 grams) | 0.20 |
| Per cent chlorine | 0.18 |

The value of $n$ is thus 0.42 and the 1,2-epoxy equivalency is 1.88.

Polyether L-3

Resorcinol is dissolved in epichlorhydrin in the proportion of 1 mol of resorcinol to 10 of epichlorhydrin containing about 1% of water. Solid sodium hydroxide is added in three successive portions in total amount of 2.04 mols per mol of resorcinol with a short heating up time, and rapid reaction and control of temperature. The product is isolated from benzene solution as described above. The obtained glycidyl polyether of resorcinol is a viscous liquid having a Durrans' melting point of −9° C., an epoxide equivalent weight of 136.5 and a chlorine content of 0.40%.

Polyether L-4

Glycidyl polyether is prepared from 142 parts of 1,1-bis(4-hydroxyphenyl)ethane dissolved in 644 parts of epichlorhydrin. The mixture is slowly heated to 70–80° C. and a total of 54.5 parts of solid caustic pellets are slowly added. The temperature rises to about 115° C., but falls to 100° C. as water forms during the reaction, the reaction mixture being refluxed. After about 1.5 hours reaction time, the excess epichlorhydrin is then distilled off under vacuum. Benzene in amount of 150 parts is added to the residue and the mixture is filtered free of salt. The filtered salt is washed with a like amount of fresh benzene and the washing combined with the benzene solution of product. The benzene and traces of epichlorhydrin are then removed from the product by vacuum distillation at a pressure of 0.5 mm. Hg up to a temperature of about 165° C. The resulting liquid glycidyl polyether has the following properties.

| | |
|---|---|
| Durrans' melting point °C | 2 |
| Molecular weight | 342 |
| Epoxide value (equivalents epoxide per 100 grams) | 0.540 |
| Epoxide equivalent weight | 185 |
| Hydroxyl value (equivalents hydroxyl per 100 grams) | 0.08 |
| Per cent chlorine | 0.73 |

Calculation gives $n=0.06$ and the 1,2-epoxy equivalency is 1.85.

Polyether L-5

A solution of 100 parts of 1,1-bis(4-hydroxyphenyl)-2-ethylhexane dissolved in 308 parts of epichlorhydrin containing 1.3 parts of water is heated to 90° C. Then 27.7 parts of sodium hydroxide are added at a rate sufficient to keep the reaction mixture refluxing at 95–100° C. from the heat of reaction. The excess epichlorhydrin is stripped out to a final temperature of 150° C. under 10 mm. pressure of Hg. Two hundred parts of benzene are added, the precipitated sodium chloride removed by filtration and benzene distilled off to a final temperature of 180° C. at 8–10 mm. Hg pressure. The resulting viscous glycidyl polyether has the following properties.

| | |
|---|---|
| Durrans' melting point °C | 14 |
| Molecular weight | 441 |
| Epoxide value (equivalents epoxide per 100 grams) | 0.39 |
| Epoxide equivalent weight | 256 |
| Hydroxyl value (equivalents hydroxyl per 100 grams) | 0.12 |
| Per cent chlorine | 1.3 |

With this product, $n=0.18$ and the 1,2-epoxy equivalency is 1.72.

Preparation and properties of high melting glycidyl polyethers will next be exemplified.

Polyether H-1

In a vessel fitted with an agitator, 228 parts of 2,2-bis(4-hydroxyphenyl)propane and 55 parts of sodium hydroxide as a 10% aqueous solution are introduced and heated to about 45° C. whereupon 113 parts of epichlorhydrin are added rapidly while agitating the mixture. The temperature of the mixture is then gradually increased and maintained at about 95° C. for 80 minutes. The mixture separates into a two-phase system and the aqueous layer is drawn off from the taffy-like product which forms. The latter is washed with hot water while molten until the wash water is neutral to litmus. The product is then drained and dried by heating to a final temperature of 130° C. The resulting solid glycidyl polyether has the following properties.

| | |
|---|---|
| Durrans' melting point °C | 98 |
| Molecular weight | 1400 |
| Epoxide value (equivalents epoxide per 100 grams) | 0.12 |
| Epoxide equivalent weight | 834 |
| Hydroxyl value (equivalents hydroxyl per 100 grams) | 0.348 |
| Per cent chlorine | 0.14 |

The value of $n$ is 3.74 and the 1,2-epoxy equivalency is 1.68.

Polyether H-2

To 100 parts of Polyether L-1, there are added 45 parts of 2,2-bis(4-hydroxyphenyl)propane and the mixture is heated at 200° C. for 90 minutes with occasional stirring. The proportion of dihydric phenol is such that about 0.78 equivalent of phenolic hydroxyl group is initially present per equivalent of epoxide in the glycidyl polyether. The resulting solid product has the following properties.

| | |
|---|---|
| Durrans' melting point °C | 86 |
| Molecular weight | 1230 |
| Epoxide value (equivalents epoxide per 100 grams) | 0.117 |
| Epoxide equivalent weight | 855 |
| Hydroxyl value (equivalents hydroxyl per 100 grams) | 0.354 |
| Per cent chlorine | 0.32 |

This high melting thermoplastic glycidyl polyether of 2,2-bis(4-hydroxyphenyl)propane has $n=3.1$ and a 1,2-epoxy equivalency of 1.44.

Polyether H-3

To 100 parts of Polyether H-1 heated to about 150° C. there are added 5 parts of 2,2-bis(4-hydroxyphenyl)propane. The heating is continued for about 2 hours while stirring and gradually increasing the temperature to 200° C. The resulting solid product has the following properties.

| | |
|---|---|
| Durrans' melting point °C | 122 |
| Molecular weight | 2900 |
| Epoxide value (equivalents epoxide per 100 grams) | 0.06 |
| Epoxide equivalent weight | 1670 |
| Hydroxyl value (equivalents hydroxyl per 100 grams) | 0.37 |
| Per cent chlorine | 0.13 |

The value of $n$ is 9.0 and the 1,2 epoxy equivalency is 1.7.

Polyether H-4

By using 7.75 parts of 2,2-bis(4-hydroxyphenyl)propane with 100 parts of Polyether H-1 and effecting the reaction under the same conditions as described above for Polyether H-3, there is obtained glycidyl polyether having the following properties.

| | |
|---|---|
| Durrans' melting point °C | 148 |
| Molecular weight | 3750 |
| Epoxide value (equivalents epoxide per 100 grams) | 0.036 |
| Epoxide equivalent weight | 2780 |
| Hydroxyl value (equivalents hydroxyl per 100 grams) | 0.40 |
| Per cent chlorine | 0.13 |

This solid product has $n=12.0$ and an epoxide equivalency of 1.35.

Compositions of our invention are prepared from the above-described polyethers by adding and mixing 3 to 20 parts, preferably 5 or 10 parts, by weight of small particles of any one of Polyether H-1, H-2, H-3 or H-4 with 100 parts by weight of any one of Polyether L-1, L-2, L-3, L-4 or L-5 heated to about 80° C. to 100° C., and continuing the heating at such temperature until the particles dissolve and homogenize which occurs in not over about 2 hours' time. Upon cooling to room temperature of about 25° C., the compositions are liquid although some have high viscosity.

Viscosity data on certain compositions of the invention are tabulated below, the viscosity having been measured with a Brookfield viscosimeter at 25° C. The viscosity of Polyether L-1 is 12,400 centipoises and that of Polyether L-2 being above 100,000 centipoises. The upper limits of measurement with the Brookfield viscosimeter is 100,000 centipoises. The parts are by weight for the tabulated compositions.

Table I

| No. | Composition | Viscosity |
|---|---|---|
| | 100 parts Polyether L-1 plus: | |
| 1 | 5 parts Polyether H-1 | 30,200. |
| 2 | 5 parts Polyether H-3 | 45,500. |
| 3 | 5 parts Polyether H-4 | 54,600. |
| 4 | 10 parts Polyether H-1 | 64,400. |
| 5 | 10 parts Polyether H-3 | 89,300. |
| 6 | 10 parts Polyether H-4 | above 100,000. |

In order to effect cure, 4.76% by weight of piperidine was added to each of compositions Nos. 1 to 3, and 4.55% by weight to each of compositions Nos. 4 to 6. The mixtures were then heated for 24 hours in an air oven set at 60° C. The resulting cured resins were hard and tough.

Various optional ingredients can be incorporated with the compositions of the invention. Their choice and amount is largely governed by the particular use to which the compositions are put. In using the compositions for adhesive purposes, it is helpful with the more viscous compositions to have the mixture more spreadably fluid at room temperatures (20–25° C.) in order that the material may be applied as well as cured without application of heat. In such cases, this may be accomplished by incorporating with the composition a fluidizing amount of a normally liquid solvent, which solvent remains in the cured composition. For this purpose, reactive diluents are suitable such as normally liquid mono-epoxy compounds. The mono-epoxy compound used as a reactive diluent in the compositions contains but a single epoxy group, is a liquid at ordinary temperature, and has a low viscosity such as less than 5 poises at 25° C. These are the only essential limitations on the suitability of any particular mono-epoxy compound although it is preferred that the compound be devoid of any other group reactive with glycidyl ethers. In being a mono-epoxy compound, customary usage of the word epoxy is employed, namely, that the compound contains a structure in which an oxygen atom has the two bonds thereof linked to different saturated carbon atoms which are vicinal carbon atoms in being linked directly together. The compounds thus contain the group

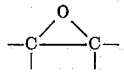

The epoxy group may either be in terminal location or be an interior group. Among representative compounds suitable for incorporation in the compositions are propylene oxide, butylene oxide, isobutylene oxide, butadiene monoxide, 1,2-pentylene oxide, 2,3-hexylene oxide, 3,4-hexylene oxide, 3-ethyl-2,3-pentylene oxide, epichlorhydrin, epibromhydrin, octylene oxide, styrene oxide, glycidol, decylene oxide, and the like. It is preferred to use a mono-epoxy compound which is substantially a non-volatile at ordinary temperature such as is the case with those having a boiling point above 100° C. at normal atmospheric pressure. Among the members of this preferred class of mono-epoxy compounds are the monoglycidyl ethers including methyl, ethyl, isopropyl, allyl, crotyl, isoamyl, phenyl, o-tolyl, p-tolyl, thymyl, and naphthyl glycidyl ethers.

Another fluidizing diluent employed in certain of the compositions of the invention is a cyano-substituted hydrocarbon. They are normally liquid in having a melting point below 10° C. and contain one or more nitrile groups linked to the hydrocarbon radical which may be of any type desired, saturated or unsaturated; aliphatic, alicyclic or aromatic. Although it has been found that acetonitrile or methyl cyanide is a particularly preferred member, examples of other non-limiting compounds include propionitrile, butyronitrile, capronitrile, lauronitrile, acrylonitrile, methacrylonitrile, crotonitrile, oleonitrile, 2-cyano-1,3-butadiene, succinonitrile, glutaronitrile, adiponitrile, fumaronitrile, allyl-malononitrile, cyclopentyl cyanide, cyclohexyl cyanide, 1,2-dicyanocyclohexane, benzonitrile, and phenyl-acetonitrile. In general, it is preferred to employ a cyano-substituted saturated hydrocarbon containing one to two cyanide groups, which compound contains 2 to 8 carbon atoms. Good results are obtained with alkyl cyanides containing up to 4 carbon atoms, although higher members of this class containing up to 12 carbon atoms and having melting points below 10° C. may be used, if desired.

The compositions may also contain one or more comminuted inorganic fillers such as asbestos, aluminum oxide, silica, bauxite, zinc oxide, china clay, titanium oxide, silicon carbide, and the like.

In using the compositions of the invention, a hardening agent is incorporated therewith. Upon the addition of the hardening agent, the composition begins to cure and harden even at ordinary temperature. A great variety of substances are now known to be hardening agents for the resin-forming ingredients of the composition such as alkalies like sodium or potassium hydroxide; alkali phenoxides like sodium phenoxides; carboxylic acids or anhydrides such as formic acid, oxalic acid or phthalic anhydride; Friedel-Crafts metal halides like aluminum chloride, zinc chloride, ferric chloride, or boron trifluoride, as well as complexes thereof with ethers, acid anhydrides, ketones, diazonium salts, etc.; phosphoric acid and partial esters thereof including n-butyl orthophosphate, diethyl orthophosphate and hexaethyl tetraphosphate; and amino compounds such as triethyl amine, ethylene diamine, diethyl amine, diethylene triamine, triethylene tetramine, pyridine, piperidine, N,N-diethyl-1,3-propanediamine, dicyandiamide, melamine, and the like. The hardening agent is added and mixed in with the composition in order to effect hardening. The amounts vary considerably depending upon the particular agent employed. For the alkalies or phenoxides, 2 to 4 per cent is suitable. With phosphonic acid and esters thereof, good results are obtained with 1 to 10 per cent added. The amino compounds are used in amounts of about 5 to 15 per cent and the others involve addition of about 1 to 20 per cent.

In applying the composition for adhesive purposes, the composition which may also contain various optional constituents has added thereto sufficient hardening agent and the mixture is applied as by spreading upon a surface desired to be united to another surface at a thickness of about 0.0005 to 0.1 inch thickness. The adhesive mixture is suitable for uniting various surfaces such as wood to wood, wood to metal, metal to metal, resin to resin, or any combination thereof. After application and joinder of the surfaces desired to be united, the adhered articles are allowed to cure for a period of from about 30 minutes to a day or more, depending upon the hardening agent and temperature employed. In this time when heating is omitted, the adhesive composition will set up to a solid which will permit ordinary handling thereof. Maximum strength for the adhesive layer will be reached within one day to two weeks. While the application is effected at ordinary atmospheric temperature and the curing may also be permitted to occur at such temperatures, the curing may be effected in shorter times at elevated temperatures such as up to 75° C., 100° C., 150° C., or even higher in some cases. In cases where elevated curing temperature is employed, the chosen temperature is below the boiling temperature of the lowest boiling constituent contained in the mixture, and preferably, it is at least 20° C. below such boiling temperature.

The cured resin from the compositions of the invention has very high physical strength and toughness as may be observed by subjecting the resin to thermal shock tests. Like other resinous materials, the cured resin has low heat conductivity. If a sizable sample of the resin is thrust into a medium of appreciably different temperature from the initial temperature of the sample, great physical strain occurs in the outer part of the sample from thermal expansion or contraction with the result that the sample will crack unless it has the strength and toughness needed to withstand the test. For example, a 50 gram sample of the composition containing 100 parts by weight of Polyether L–1 and 10 parts of Polyether H–3 was prepared and placed in a paper cup along with another 50 gram sample of Polyether L–1 alone in another cup. To each were added 2.5 grams of piperidine as curing agent. The samples were resinified to hard resins by heating for 24 hours in an oven set at 60° C. The paper cups were removed and the cured resin samples were subjected to the following thermal shock test. The samples were placed in an oven set at 150° C. for ½ hour, then removed and allowed to cool at room temperature for ½ hour, next thrust into crushed solid carbon dioxide (Dry Ice) at about −70° C. for ½ hour, and then allowed to warm at room temperature during ½ hour. This cycle was then repeated. It was found that the resin sample from resinification of Polyether L–1 alone cracked in the hot portion of the fifth cycle. On the other hand, the resin sample from the composition of the invention passed seven cycles without cracking and then also passed fifty more cycles as described except that the oven temperature was increased at 200° C. The test was then stopped without this resin sample being fractured or cracked.

When employed in adhesive formulations, the compositions of the invention have the important advantage of imparting to the cured resin bond great resistance against mechanical shock. In other words, the impact strength obtained with cured adhesives from the compositions containing the mixture of high melting and low melting glycidyl polyethers is markedly higher than that obtained with a cured adhesive from a single glycidyl polyether. The impact strength or resistance against mechanical shock is of prime importance especially when the adhesives are employed for metal-to-metal bonding.

The unusually high impact strengths obtained with compositions of the invention will be illustrated. Formulations were prepared containing the constituents and amounts given in Table II below. Allyl glycidyl ether was incorporated in the formulations in such amounts as to provide spreadable fluidity. A formulation employing a single glycidyl polyether was included for comparison. The parts were by weight. To each composition there were added 8 parts of N,N-diethyl-1,3-propanediamine as curing agent. The freshly prepared mixtures were spread on a one inch square surface of clean aluminum blocks of about one-quarter inch thickness with a 5 mil doctor blade. Coated surfaces of two blocks were joined and the adhesive cured by heating the joined blocks in an oven for 45 minutes at 200° F. After cooling, the Izod impact strength was determined according to ASTM method D-950-47T. The results are given in the following table. For the compositions of the invention, it was found that the impact strength was greater than the limit of the testing machine and amounted to more than 15 foot-pounds per square inch.

*Table II*

| Low Melting Polyether | High Melting Polyether | Allyl Glycidyl Ether as Diluent | Impact Strength, ft.-lbs./sq. in. |
| --- | --- | --- | --- |
| 100 parts L–1 | 10 parts H–1 | 1 part | >15.0 |
| 100 parts L–1 | 10 parts H–2 | 3.5 parts | >15.0 |
| 100 parts L–1 | 10 parts H–3 | 4.5 parts | >15.0 |
| 85 parts L–2 | none | 15 parts | 1.6 |

The compositions of the invention are very useful in adhesives for joining a variety of metals as will be evident from the following. The composition consisted of 100 parts by weight of Polyether L–1 containing 5 parts of Polyether H–3 to which were added 5 parts of piperidine as curing agent. The freshly prepared mixture was spread on a one inch square surface of each of two blocks of the metals listed in Table III below with a 5 mil doctor blade. The coated surfaces were joined and the adhesive was cured by baking the joined blocks in an oven for 24 hours at 60° C. After cooling, the blocks were subjected to the block shear test of the Army-Navy-Civil Committee on Aircraft Design Criteria: "Wood Aircraft Inspection and Fabrication," ANC-19 (Dec. 20, 1943), discussed in an article by R. C. Rinker and G. M. Kline, Modern Plastics, vol. 23, page 164, 1945. The shear strengths at 77° F. for the blocks were as follows.

*Table III*

| Block material: | Shear strength, pounds/sq. in. |
| --- | --- |
| Aluminum (24ST) | 3030 |
| Aluminum (Alclad) | 5390 |
| Magnesium | 2045 |
| Stainless steel (18–8) | 4045 |
| Copper | 3670 |
| Brass | 1965 |
| Hot rolled steel | 2740 |
| Cold rolled steel | 3120 |
| Gold plated steel | 1460 |
| Silver plated steel | 1770 |
| Nickel | 4975 |

We claim as our invention:

1. A composition comprising a first glycidyl polyether of a dihydric phenol in admixture with about an added 3% to 20% by weight of a second glycidyl polyether of a dihydric phenol, which polyethers have a chain of alternating glyceryl and divalent aromatic radicals united through ether oxygen with glyceryl radicals in terminal position; said first polyether having a Durrans' Mercury Method melting point below 25° C., having a 1,2-epoxy equivalency between 1.7 and 2.0, and containing 1 to 1.5 of the aromatic radicals in the average molecule thereof; and said second polyether having a Durrans' Mercury Method melting point above 75° C., having a 1,2-epoxy equivalency of 1.2 to 1.8, and containing at least 4 of the aromatic radicals in the average molecule thereof.

2. A composition as defined by claim 1 wherein the dihydric phenol of the first glycidyl polyether is different from the dihydric phenol of the second glycidyl polyether.

3. A composition as defined by claim 1 wherein the dihydric phenol of the first and second glycidyl polyethers is the same.

4. A composition as defined by claim 1 wherein the dihydric phenol of both glycidyl polyethers is 2,2-bis(4-hydroxyphenyl)propane.

5. A composition as defined by claim 1 wherein the dihydric phenol of the first glycidyl polyether is 1,1-bis(4-hydroxyphenyl)ethane.

6. A composition as defined by claim 1 wherein the dihydric phenol of the second glycidyl polyether is 2,2-bis-(4-hydroxyphenyl)propane.

7. A composition as defined by claim 1 wherein the dihydric phenol of the first glycidyl polyether is 1,1-bis(4-hydroxyphenyl)ethane and the dihydric phenol of the second glycidyl polyether is 2,2-bis(4-hydroxyphenyl)-propane.

8. A composition as defined by claim 1 wherein the dihydric phenol of both glycidyl polyethers is 2,2-bis(4-hydroxyphenyl)propane, and the Durrans' Mercury Method melting point of the first glycidyl polyether is below 15° C. and that of the second is between 125° C. and 180° C.

9. A composition as defined by claim 1 wherein the percentage of added second glycidyl polyether is about 5%, the dihydric phenol of both glycidyl polyethers is 2,2-bis(4-hydroxyphenyl)propane, and the Durrans' Mercury Method melting point of the first glycidyl polyether is from 5° C. to 12° C., and that of the second glycidyl polyether is from 140° C. to 160° C.

10. A composition as defined by claim 1 wherein the percentage of added second glycidyl polyether is about 10%, the dihydric phenol of both glycidyl polyethers is 2,2-bis(4-hydroxyphenyl)propane, and the Durrans' Mercury Method melting point of the first glycidyl polyether is from 5° C. to 12° C., and that of the second glycidyl polyether is from 140° C. to 160° C.

References Cited in the file of this patent

UNITED STATES PATENTS

| 2,528,933 | Wiles | Nov. 7, 1950 |
| 2,569,920 | Buck et al. | Oct. 2, 1951 |
| 2,642,412 | Newey et al. | June 16, 1953 |